July 6, 1965 G. H. PERRY ETAL 3,193,804

ELECTRONIC INFORMATION STORAGE CIRCUIT UTILIZING NEGATIVE RESISTANCE ELEMENTS

Filed March 21, 1962 3 Sheets-Sheet 1

Inventors
Gerald Horace Perry
Eric William Shallow
By Cushman, Darby & Cushman
Attorneys Inventors
Gerald Horace Perry
Eric William Shatlow
By Cushman, Darby & Cushman
Attorneys July 6, 1965 G. H. PERRY ETAL 3,193,804

ELECTRONIC INFORMATION STORAGE CIRCUIT UTILIZING NEGATIVE RESISTANCE ELEMENTS

Filed March 21, 1962 3 Sheets-Sheet 3

Inventors
Gerald Horace Perry
Eric William Shaflow
By Cushman, Darby & Cushman
Attorneys 3,193,804

ELECTRONIC INFORMATION STORAGE CIRCUIT UTILIZING NEGATIVE RESISTANCE ELEMENTS

Gerald Horace Perry and Eric William Shallow, Malvern, England, assignors to National Research Development Corporation, London, England, a British corporation
Filed Mar. 21, 1962, Ser. No. 181,371
Claims priority, application Great Britain, Apr. 13, 1961, 13,289/61
10 Claims. (Cl. 340—173)

This invention relates to electronic circuits of the kind used for the storage of information, in electronic digital computers for example.

The use of tunnel diodes as memory elements for storage circuits is attractive for many reasons. They are inherently fast switching devices, presently available samples operating in the 1–10 millimicrosecond (ms.) region, and the power requirements can be as little as 0.3 mw. per storage element. The requirements for pulse generators to operate the store are not onerous in view of the low levels of the voltage and current pulses needed.

A load line placed in the characteristic voltage-current curve of a tunnel diode intersects two regions of different positive resistivity, one low and one high and the invention uses this property to provide for non-destructive testing of the state of a tunnel-diode storage circuit.

According to the invention in one aspect an electronic information storage circuit comprises a diode having a negative resistance region in its forward voltage-current characteristic a resistive impedance connected in series with a current supply to the diode whereby the diode possesses two stable states one low resistance and one high resistance corresponding to points on the voltage-characteristic separated by the negative resistance region, and detection means for detecting the resistance state, high or low, of the diode.

According to the invention in another aspect an electronic information storage circuit comprises a plurality of individual storage circuits arranged in a matrix of columns and rows, the individual storage circuits comprising an electronic information storage circuit comprising a first diode having a negative resistance region in its forward voltage-current characteristic, a first resistive impedance connected in series with a current supply to the diode, a second diode having a negative resistance region in its forward voltage-current characteristic, and a second resistive impedance in series with a current supply to the second diode, the current supply being connected as a common supply to all the diode-resistive impedance combinations of a column of the matrix, an interrogating circuit associated with each column and connected in common to the diode of all the storage circuits in the column for applying an increment of bias voltage to each diode, a difference circuit associated with each row for differencing signals occurring in the diodes of a pair and connected in an output circuit common to the pairs of diodes of all the storage circuits in the row, a first digit circuit for setting a diode in one of its two states associated with each row and connected in common via individual resistive impedances to the first diode of each diode pair of the row, and a second digit circuit for setting a diode in one of its two states associated with each row and connected in common via individual resistive impedances to the second diode of each diode pair of the row, whereby operation of an interrogating circuit applies an increment of bias voltage to the diodes of a column and signals appearing at the difference circuits of each row indicate according to their polarity the states of the diode pairs of the column, and operation of the interrogating circuit of a given column at the same time as the first and second digit circuits of a given row are energised determines the states of the diode pair corresponding to the intersection of the given column and row.

Reference will be made to the accompanying drawings in which.

Figure 1:
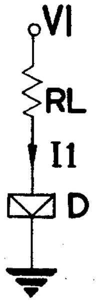
FIG. 1 shows a simple tunnel diode circuit.
Figure 2:
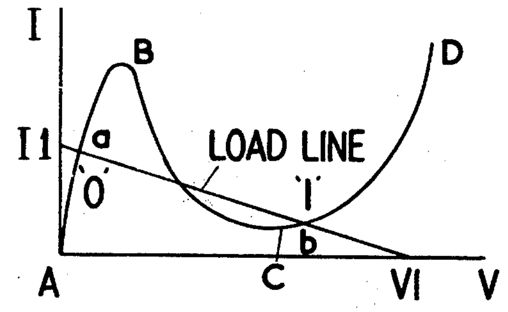
FIG. 2 shows a typical tunnel diode current-voltage characteristic.

In FIG. 1 a tunnel diode D is connected in series with a load resistor RL across a source of voltage V1. A typical current-voltage characteristic curve for a tunnel diode is shown in FIG. 2.

In the curve region B–C represents an unstable, negative resistance, but regions A–B and C–D onwards represent stable, positive resistances.

It is possible to use a tunnel diode to store binary information by suitably biassing the diode into one or other of the two stable regions. A point may be chosen between points A and B to represent "0" for example, and a point from C onwards to represent "1." A load line may be drawn on the characteristic as shown. In the instance of FIG. 2 a voltage V1 is being used with a resistor $$RL\left(=\frac{V1}{I1}\right)$$

and the load line is cutting the positive resistance parts of the characteristic at *a* and *b*. Thus, a diode storing a "0" would be sitting at the point *a*, while a diode storing a "1" would be sitting at the point *b*.

Interrogation of the circuit to determine whether a "1" or a "0" is being stored is possible in two ways. Each method has two variants depending on whether a voltage or a current is measured. For instance if the voltage across the diode is measured, the "0" state shows a lower voltage level than the "1" state, and conversely if the current through the diode is measured, the "0" state shows a higher current than the "1" state. This is a static method of non-destructive reading.

A dynamic method of interrogation is to clear the circuit to a known state. This usually means switching to the "0" state and monitoring the resultant change in diode voltage or current. Reducing V1 to zero for instance would give a small voltage change for the "0" state and a large voltage change for the "1" state, while a large current change would be obtained for the "0" state and a small current change for the "1" state. This is a dynamic method of destructive reading.

Points *a* and *b* may be identified however by parameters other than D.C. voltage and current. The majority of the A–B region of the curve represents a low resistance, while the initial part of the curve following C represents a high resistance. This resistive parameter can be used to identify the state of the diode when used for storage. Two methods of interrogation will now be considered, one requiring direct access to the diode, and one involving the load resistor. Each method has two variations depending on whether a voltage or current is measured.

Figure 3:
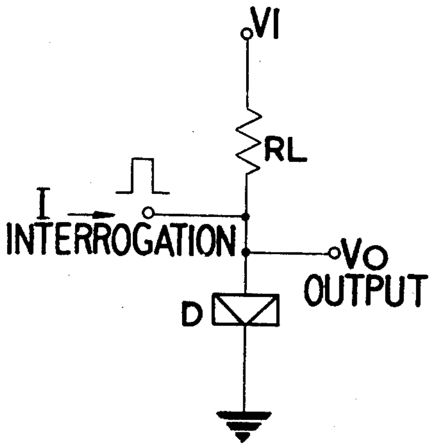
FIG. 3 shows a tunnel diode storage circuit arranged for current interrogation.
Figure 4:
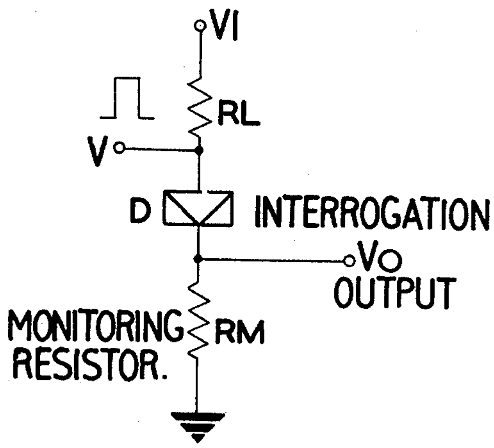
FIG. 4 shows a tunnel diode storage circuit arranged for voltage interrogation.

Two basic ways of interrogation are shown in FIGS. 3 and 4. In each case the amplitude of the interrogation pulse is limited to that value which will be insufficient to switch the diode from the "0" to the "1" state, i.e. from point *a* to point *b* on the curve. In practice an amplitude less than this may be desirable so that a diode in the "1" state is not taken too far into the low resistance region of the curve beyond C, since we only wish to operate in the high resistance region. A diode biassed to point *a*, when interrogated by a current pulse (FIG. 3) will provide a smaller voltage output than a diode biassed to point *b*; thus the "0" state is represented by a small and the "1" state by a large output pulse. If interrogation is by a voltage pulse (FIG. 4), the "0" state is represented by a large output pulse across a monitor resistor RM, and the "1" state by a small output pulse.

With the method differences in output amplitude of at least 10:1 between the two states may be obtained.

In a practical store using tunnel diodes as storage elements it is probably preferable to have access to the storage diodes via the RL resistors. If interrogation is by a current pulse, this would have negligible effect on the results achieved with direct access. However, selection requirements in a store make voltage interrogation preferable, and then the presence of RL obviously affects adversely the state discrimination properties of the circuit, by causing the diode to be virtually current interrogated so that little difference in output current will be observed between the two states. To get the best discrimination the circuit has to be treated as a true current interrogation system and the voltage across the diode taken to indicate the output.

Unfortunately for simplicity of operation in a store, it is preferable to take the output from the diodes as a current rather than a voltage. Thus we require a voltage interrogation system involving RL (thus producing almost a current interrogation) coupled with a detector of output current. To make such a system reliable the ratio of the two current obtained when the two states are interrogated should preferably be greater than 2:1. Obviously the smaller the value of RL, the more the change in output current is dependent only on the change in diode dynamic resistance. From this point of view a diode having a high value of I*p* (current value at point B) is to be preferred, for the value of RL is reduced for such a diode to provide the same position of load line as for a diode of lower I*p*. This, however, necessarily increases the power required to maintain the diode in each state.

To overcome this difficulty two diodes per bit can be used in a circuit which provides a change of sign rather than of amplitude to indicate the two binary states.

Figure 5:
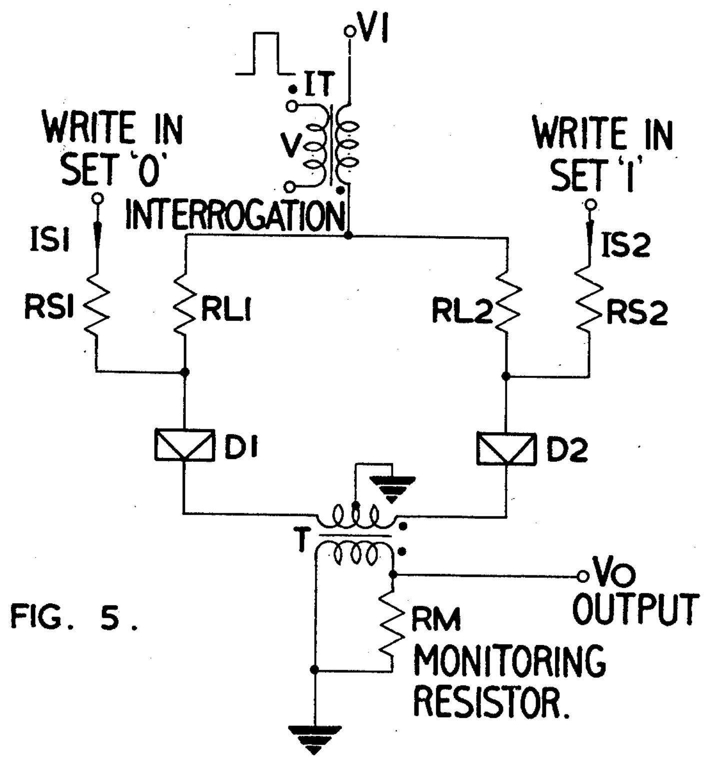
FIG. 5 shows a tunnel diode storage circuit using two diodes per bit.

FIG. 5 shows the circuit arrangement of a two-diode per bit storage circuit employing voltage interrogation. Two diodes D1 and D2 are connected across a voltage source V1 each in series with a load resistor, RL1, RL2, and connected to the earthed, centre-tapped primary of a transformer T functioning as a difference circuit. A monitoring resistor RM is connected in the secondary circuit of the transformer T.

Writing-in terminals SET "0," SET "1" provide access to the junctions of the load resistors RL1, RL2 and the diodes D1, D2 via series resistors RS1, RS2. An interrogation transformer IT is connected with its secondary in the common connection to the voltage source V1, access for interrogation being obtained via the primary of the transformer IT.

Because the diodes D1, D2 are connected as a difference circuit, it follows that, ideally, if the diodes D1, D2 are biassed to similar points on identical characteristics the interrogation voltage produces equal current through the diodes. These currents produce no resultant field and hence no flux change in the primary so that no secondary current may flow. Should one diode present a higher resistance than the other, the difference between their currents when interrogated will establish a field in the transformer core; flux change occurs in the primary and secondary secondary flows. The direction of this current depends on which diode passes the greater current. In the circuit shown if the diode D1 were of lower resistance than the diode D2 the direction of secondary current would produce a negative output voltage V*o*; and vice versa.

This gives a dynamic method of non-destructively reading the state of the circuit. A CLEAR, neutral state in which the circuit stores neither a "1" nor a "0" is obtained by reducing V1 to zero, or at least to less than V*p* (voltage value at point B) so that when V1 is restored each diode is biassed to point *a*. This may be done either by altering V1, or, preferably, modulating the voltage across the circuit by pulsing the interrogation transformer in the opposite phase to that used when interrogating. To store "0" say, the diode D1 is biassed to point *b* leaving the diode D2 at point *a*. The diode D1 therefore presents a higher resistance than the diode D2 to the interrogation voltage, and so the output voltage V*o* is positive at this time. To store "1," the diodes' roles would be reversed; then the output voltage V*o* is negative-going when the circuit is interrogated.

To set the circuit to the "0" or "1" state a voltage pulse of appropriate polarity is applied across the write-in terminals SET "0," SET "1." The value of this voltage and of the series resistor RS would be chosen so that the resulting current I*s* would drive the diode from point *a* past point B so that it switched into the positive resistance region of C onwards. Hence *Is*+*I1* must be greater than I*p* and if we wish, the current I1 may be increased at write-in so that the required value of the current I*s* is reduced. The current I1 may not be increased to a value equal to the current I*p* otherwise both diodes will be switched. However, a combination of increase in the voltage V1, and so of the diode current I1, plus the addition of the current I*s* is convenient at write-in time, because this permits coincidence selection in a store which uses these circuits as storage elements.

Figure 6:
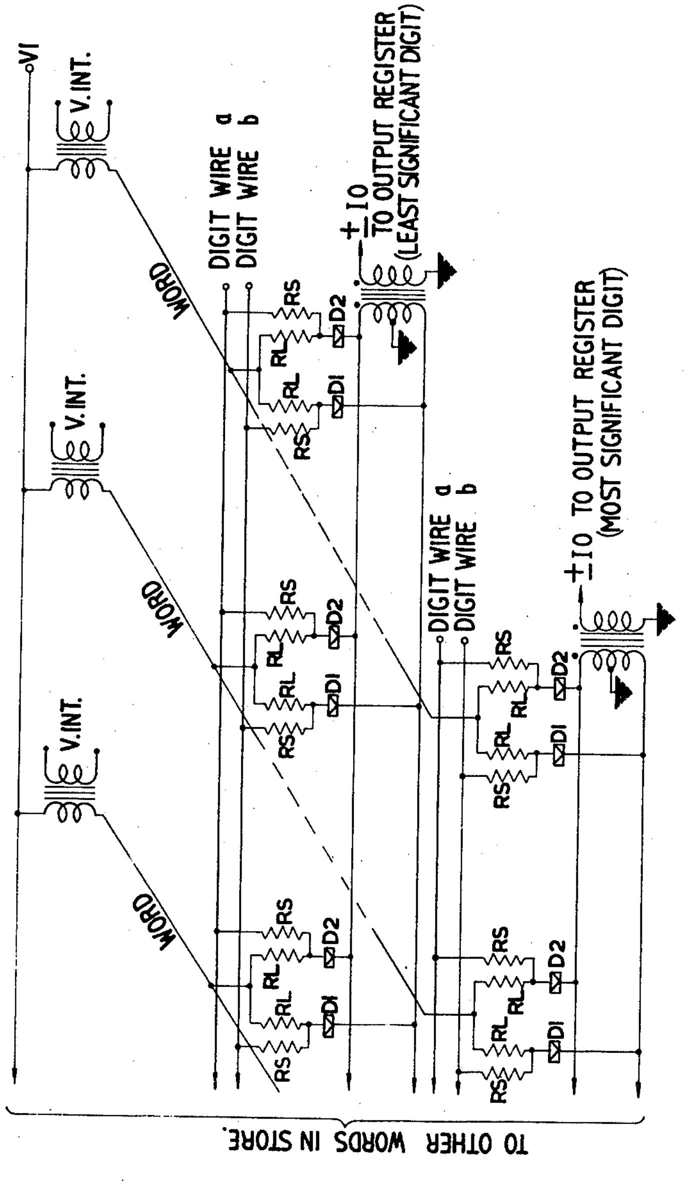
FIG. 6 shows a layout for a two-diode per bit information store.

A method of wiring a store using the above storage elements is shown in FIG. 6. It is assumed that a word selection system is also used so that a whole word may be cleared, written-in or interrogated. For simplicity of illustration the store is depicted as a single layer in side and front view although in practice it would be in the form of a multi-layer cube for greater convenience of selecting words. Common WORD wires link the diode pair stores of each column (word of the store), the rows of storage pairs being across the figure from left to right.

Figure 7:
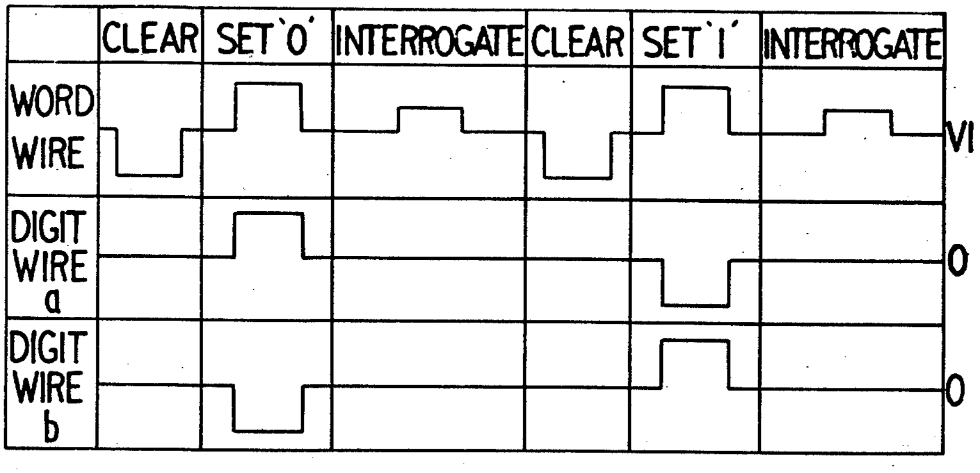
FIG. 7 shows voltage levels which occur during operation of the store of FIG. 6.

To operate on any particular word we apply the appropriate voltage to the WORD wire only for CLEAR and INTERROGATE operations. For WRITING-IN a word all the DIGIT wires are energised as well. The FIG. 7 shows the relative voltage levels applied to a WORD wire; and for one only of the *a* and *b* DIGIT wire pairs of the same column which must be energised to write-in a word.

The DIGIT wires may conveniently be connected across a transformer secondary; then to SET "0" the transformer is pulsed to take DIGIT WIRE *a* positive, DIGIT WIRE *b* being taken negative in consequence. To SET "1," the opposite polarity voltages are applied to the digit wires by pulsing the transformer in opposite polarity.

We claim:

1. An electronic information storage circuit comprising:

(a) a first diode-resistive-impedance combination comprising:

a diode having a negative resistance region in its forward voltage-current characteristic, and a resistive impedance for serially connecting a current supply to the diode, whereby the diode possesses two stable states one low resistance and one high resistance corresponding to points on the voltage-current characteristic separated by the negative resistance region;

(b) a second diode-resistive-impedance combination connected in parallel with said first combination and comprising:

a second diode having a negative resistance region in its forward voltage-current characteristic, and a second resistive impedance for serially connecting a current supply to the second diode, whereby the second diode possesses two stable states one low resistance and one high resistance corresponding to points on the voltage-current characteristic separated by the negative resistance region;

(c) an interrogating circuit in a circuit common to both diodes;

(d) pulsing means for pulsing the interrogating circuit with a pulse sufficiently small in magnitude that the diodes remain in the respective resistance states they occupied before the circuit was pulsed; and (e) detection means including a difference circuit responsive to the difference signal between the outputs of the two diodes.

2. An electronic information storage circuit as claimed in claim 1, wherein the interrogating circuit comprises a transformer having a primary and a secondary winding, the secondary winding being connected in series with a common supply to the two diodes via the two series impedances.

3. An electronic information storage circuit as claimed in claim 2 wherein the difference circuit comprises a transformer having a centre-tapped primary winding and a secondary winding, the centre tap being connected to a supply source, and the ends of the primary each being connected to a different one of the two diode circuits.

4. An electronic information storage circuit as claimed in claim 3 including write-in input connections comprising resistive feeds to the junction of each diode and its series impedance respectively.

5. An electronic information storage circuit as claimed in claim 1, wherein the difference circuit comprises a transformer having a centre-tapped primary winding and a secondary winding, the centre-tap being connected to a supply source, and the ends of the primary each being connected to a different one of the two diode circuits.

6. An electronic information storage circuit as claimed in claim 1, wherein write-in input connections comprise resistive feeds to the junction of each diode and its series impedance respectively.

7. An electronic information store comprising, a plurality of individual storage circuits arranged in a matrix of columns and rows, the individual storage circuits comprising an electronic information storage circuit comprising a first diode having a negative resistance region in its forward voltage-current characteristic, a first resistive impedance connected in series with a current supply to the diode, a second diode having a negative resistance region in its forward voltage-current characteristic, and a second resistive impedance in series with a current supply to the second diode, the current supply being connected as a common supply to all the diode resistive impedance combinations of a column of the matrix, an interrogating circuit associated with each column and connected in common to the diodes of all the storage circuits in the column for applying an increment of bias voltage to each diode, a different circuit associated with each row and responsive to the difference signal between the outputs of the diodes of a pair and connected via an output circuit common to the pairs of diodes of all the storage circuits in the row, a first digit circuit for setting a diode in one of its two states associated with each row and connected in common via individual resistive impedances to the first diode of each diode pair of the row, and a second digit circuit for setting a diode in one of its two states associated with each row and connected in common via individual resistive impedances to the second diode of each diode pair of the row, whereby operation of an interrogating circuit applies an increment of bias voltage to the diodes of a column and signals appearing at the difference circuits of each row indicate according to their polarity the states of the diode pairs of the column, and operation of the interrogating circuit of a given column at the same time as the first and second digit circuits of a given row are energised determines the states of the diode pair corresponding to the intersection of the given column and row.

8. An electronic information storage circuit as claimed in claim 7, wherein the connections of the first and second digit circuits via the individual resistive impedances are to the junctions of the diodes and their series resistive impedances.

9. An electronic information storage circuit as claimed in claim 8, wherein an interrogating circuit of a column comprises a transformer having a primary and a secondary winding, the secondary winding being connected in series with the common supply of a column.

10. An electronic information storage circuit as claimed in claim 9, wherein the difference circuit of a row comprises a transformer having a centre-tapped primary winding and a secondary winding, the centre-tap being connected to a supply source and the ends of the primary winding being connected to the first and second diodes of the pairs of the row.

References Cited by the Examiner

UNITED STATES PATENTS 3,011,155 11/61 Dunlap -------------- 340—173

OTHER REFERENCES

IBM Technical Disclosure Bulletin, vol. 3, No. 9, February 1961, Meyers, Esaki Diode Binary Trigger.

IBM Technical Disclosure Bulletin, vol. 3, No. 4, September 1960, Meyers, Non-Destructive Readout for Tunnel Diode Memory.

IRVING L. SRAGOW, *Primary Examiner.*